United States Patent
Yamada et al.

(10) Patent No.: US 6,260,923 B1
(45) Date of Patent: Jul. 17, 2001

(54) SEAT RECLINING MECHANISM FOR VEHICLES

(75) Inventors: Yukifumi Yamada; Toshiyuki Tanaka, both of Toyota (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/233,445

(22) Filed: Jan. 20, 1999

(30) Foreign Application Priority Data

Jan. 23, 1998 (JP) .................................. 10-011788

(51) Int. Cl.$^7$ ........................................ B60N 2/02
(52) U.S. Cl. ................ 297/366; 297/362.12; 297/367
(58) Field of Search ........................ 297/366, 362.12, 297/363, 364, 367, 378.12

(56) References Cited

U.S. PATENT DOCUMENTS 5,611,599    3/1997   Baloche et al. .
5,622,408    4/1997   Yamada et al. .
5,681,086 *  10/1997  Baloche ........................ 297/367
5,779,313 *  7/1998   Rohee ........................... 297/367
5,820,219 *  10/1998  Rohee ........................... 297/367

FOREIGN PATENT DOCUMENTS 9-154658   6/1997   (JP) .

* cited by examiner

Primary Examiner—Laurie K. Cranmer
(74) Attorney, Agent, or Firm—Burns, Doane, Swecker & Mathis, LLP

(57) ABSTRACT

There is disclosed a device for reclining a seat such that a pawl can be held with certainty at a distance from a ratchet. A pin and a cam slot are provided between the ratchet and the pawl to limit sliding movement of the pawl toward the ratchet, thus maintaining the pawl in disengagement from the ratchet.

2 Claims, 4 Drawing Sheets

SEAT RECLINING MECHANISM FOR VEHICLES

BACKGROUND OF THE INVENTION

The present invention relates to a seat reclining mechanism for vehicles for adjusting an inclination angle of a seat back with respect to a seat cushion, and more particularly to a seat reclining mechanism for vehicles having a limiting means which is mounted between a ratchet and a pawl each secured to one of the seat back and the seat cushion, respectively.

A known seat-reclining mechanism of this kind is described in Japanese Patent Laid-Open Publication No. Hei 9-154658. This device comprises a lower arm secured to a seat cushion on which a person sits, an upper arm secured to a seat back and rotatably held to the lower arm, a ratchet mounted on the upper arm, and a pawl slidably supported on the lower arm, in such a manner that when the pawl slides in a radial direction, it can come into and out of engagement with the ratchet. An operation lever or handle is linked to the pawl via a cam. The pawl can be brought into and out of engagement with the ratchet by operating the lever so as to slide the pawl over the lower arm. The rotation of the upper arm relative to the lower arm is limited by engagement of the pawl with the ratchet. The seat back is held at a given angle to the seat cushion. Rotation of the upper arm relative to the lower arm is permitted by disengaging the pawl from the ratchet. In this way, the inclination angle between the seat back and the seat cushion of the seat can be adjusted.

The ratchet of this conventional device is fitted with internal teeth in mesh with external teeth of the pawl. The ratchet further includes a non-toothed portion with which the external teeth of the pawl come into sliding contact. The internal teeth set a range in which the upper arm can rotate relative to the lower arm. The non-toothed portion sets a range in which the upper arm can rotate freely relative to the lower arm, e.g., a position in which the seat back is tilted forwardly fully about the seat cushion of the seat.

The presence of the conventional device described above presents problems. During rotation of the seat back relative to the seat cushion of the seat, the pawl makes a transition from a position where the pawl faces the internal teeth of the ratchet to a position where the pawl faces the non-toothed portion. During this movement of the pawl, the external teeth of the pawl might interfere with the ratchet at the interface step between the internal teeth of the ratchet and the non-toothed portion, depending on the position of the sliding pawl operated by the operation lever. Conversely, when the pawl moves from the position where it faces the non-toothed portion into the position where the pawl faces the internal teeth, the external teeth of the pawl come into sliding contact with the non-toothed portion of the ratchet. As a result, there arises a possibility of producing non-uniform wear.

SUMMARY OF THE INVENTION

Accordingly, it is an object of the present invention to provide a seat-reclining device capable of reliably holding a pawl at a distance from a ratchet.

This object is achieved in accordance with basic or essential teachings of the present invention by means of a limiting means mounted between the ratchet and the pawl to limit sliding movement of the pawl toward a position where the pawl comes into engagement with the ratchet, thus maintaining the pawl in disengagement from the ratchet.

With this structure, when the pawl is out of engagement with the ratchet, if the upper arm is rotated through more than a given angle relative to the lower arm, the limiting means limits sliding movement of the pawl toward the position where the pawl comes into engagement with the ratchet. The pawl is maintained in disengagement from the ratchet. This assures that the pawl is held at a distance from the ratchet.

More preferably, the limiting means described above has a pin formed on the pawl and a cam slot formed in the ratchet. The pin protrudes toward the upper arm. The pin can be inserted into the cam slot.

Other objects and features of the invention will appear in the course of the description thereof, which follows.

DETAILED DESCRIPTION OF THE PREFERRED EMBODIMENTS

Figure 4:
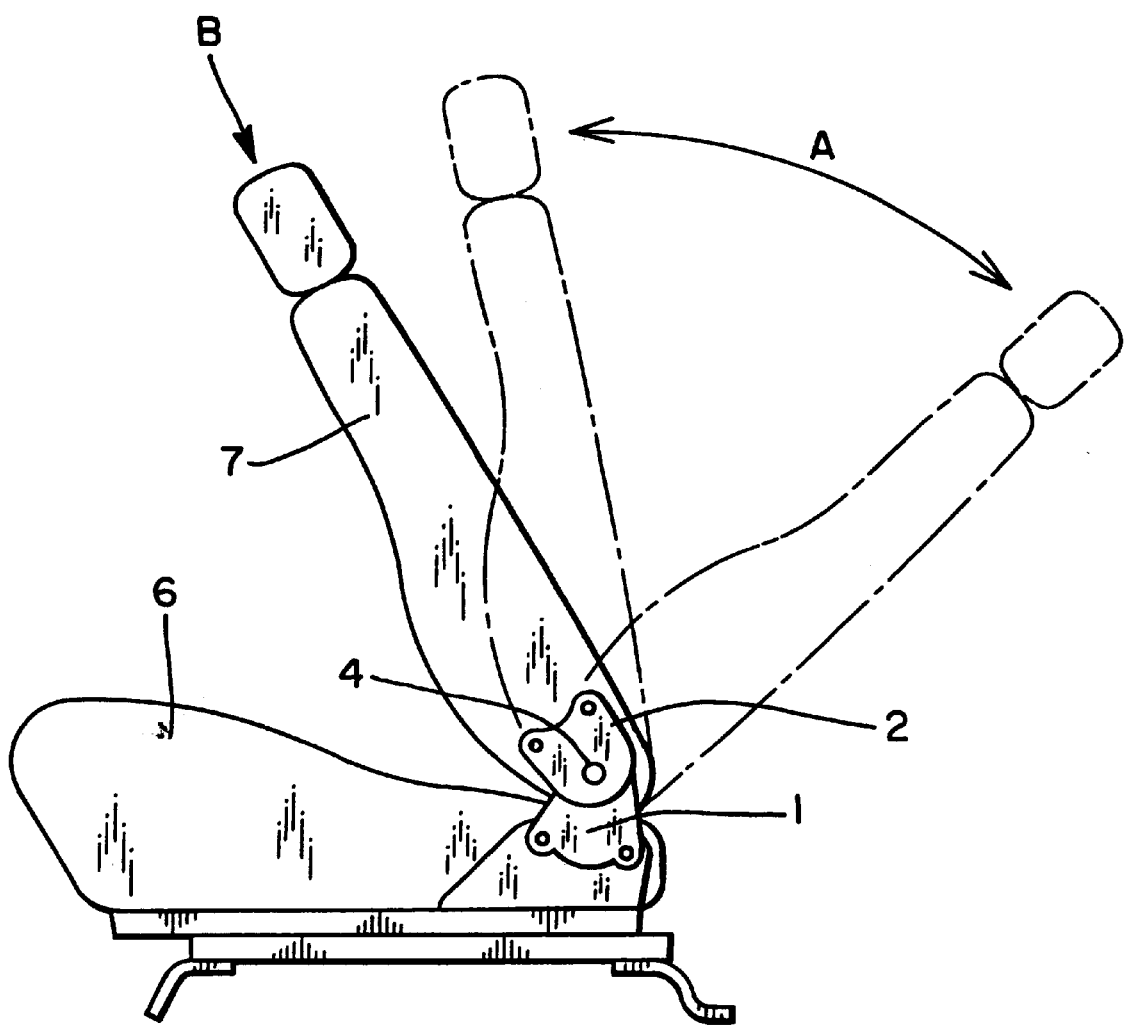
FIG. 4 is a front elevation of a seat equipped with the seat-reclining device shown in FIG. 1.

Referring to FIG. 4, there is shown a seat having a seat back 7 having a seat back frame and a seat cushion 6 having a seat cushion frame comprising cushion for seat occupants. This seat is equipped with a reclining device in accordance with the present invention. This reclining device includes a lower arm 1 secured to the seat cushion frame, an upper arm 2 secured to the seat back frame, and a rotating shaft 4.

Figure 1:
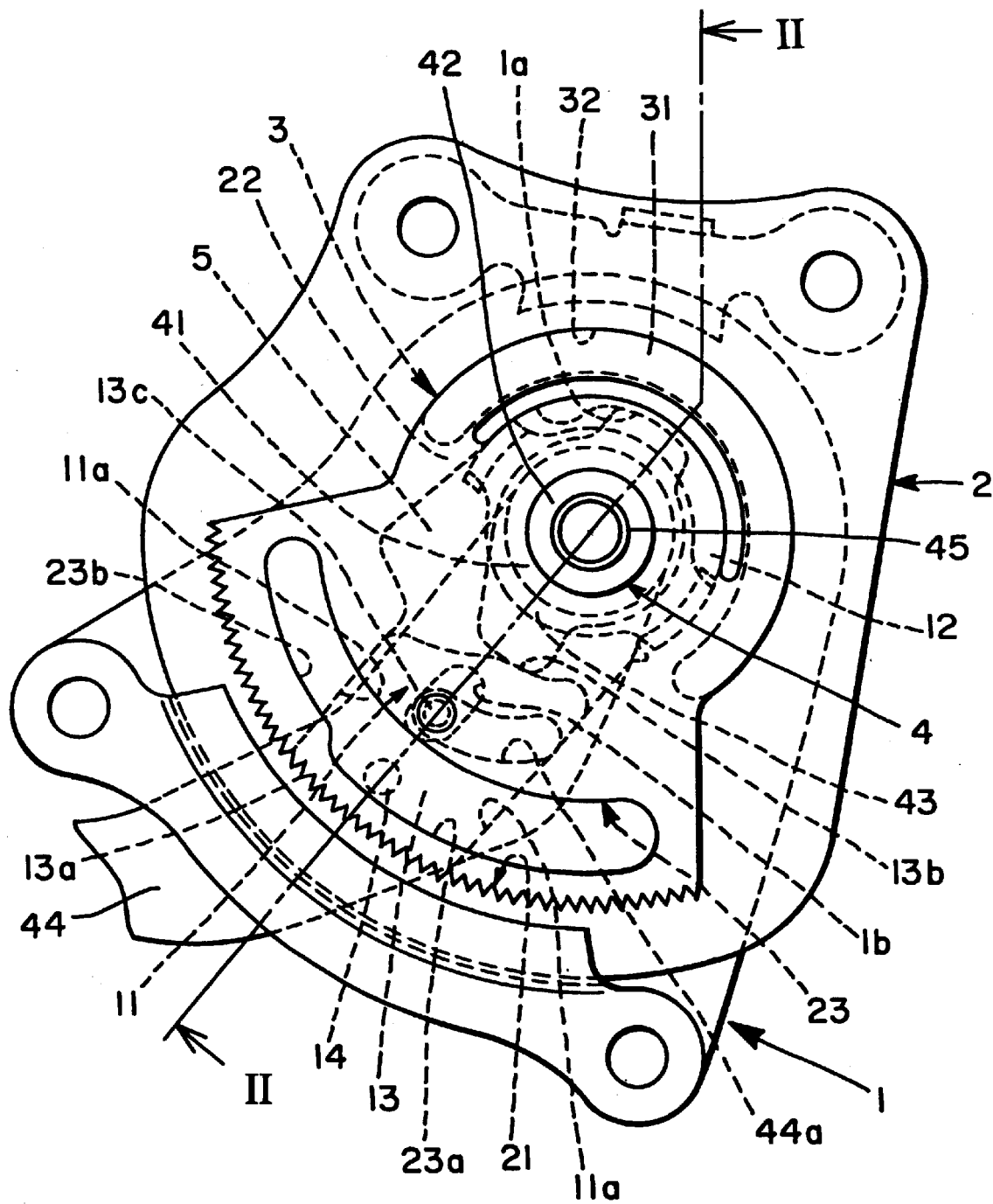
FIG. 1 is a front elevation of a seat-reclining device in accordance with the present invention.
Figure 2:
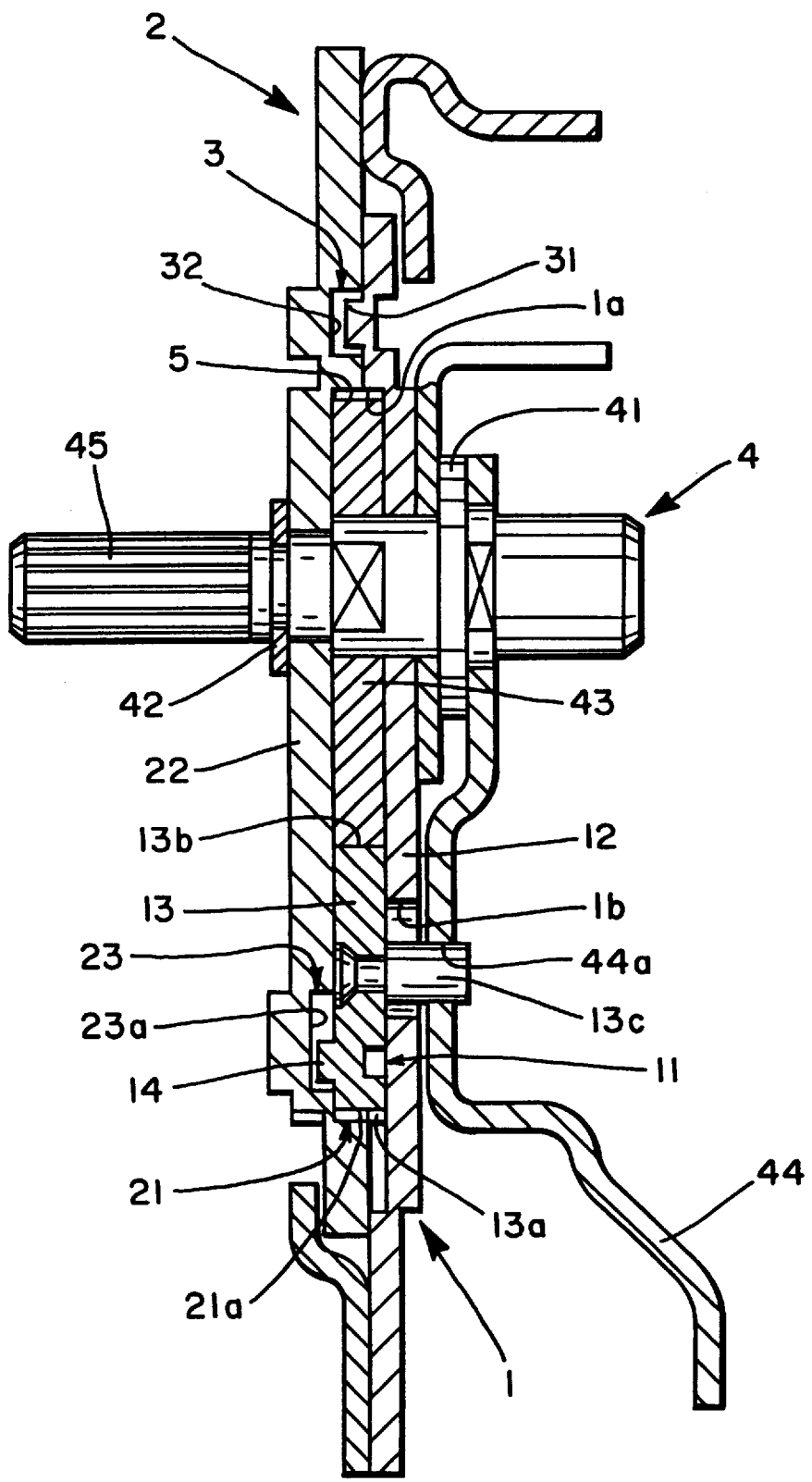
FIG. 2 is a cross-sectional view taken on line II—II of FIG. 1.

Referring also to FIGS. 1 and 2, the lower arm 1 is held at one side of the seat cushion 6. The upper arm 2 is held at one side of the seat back 7. An arc-shaped protrusion 31 is formed integrally with the lower arm 1. An integral, arc-shaped recess 32 is formed in the upper arm 2. The arc-shaped protrusion 31 fits in the arc-shaped recess 32, forming a bearing mechanism 3. The upper arm 2 is rotatably held to the lower arm 1 via the bearing mechanism 3. The rotating shaft 4 extends through the upper arm 2 and is rotatably held to the lower arm 1. The inner surface of the upper arm 2 in contact with the lower arm 1 is half blanked or pressed to form a half pressed portion 22 through which passes the rotatable shaft 4 and a ratchet 21 integrally on one side of the upper arm 2. The inner surface of the lower arm 1 in contact with the upper arm 2 is half blanked or pressed to form a guide portion 11 radially extending and a shaft bearing portion 12 in the semi-circular form integrally on the opposite side of the arm 2 in the axial direction. Thus, a closed space 5 is defined on the lower arm 1.

The rotating shaft 4 which traverses the closed space 5, is rotatably held to the shaft bearing portion 12 of the lower arm 1, and extends through the portion 22 of the upper arm 2. The arc-shaped recess 32 in the bearing mechanism 3 is continuous with or opens to the closed space 5, The shaft 4 has a flange 41, and a washer 42 is mounted to the shaft 4. These flange 41 and washer 42 limit axial movement of the lower arm 1 and the upper arm 2 to prevent these arms from coming off the rotating shaft 4.

A cam member 43 and a pawl 13 are accommodated in the closed space 5. The cam member 43 is held to the rotating shaft 5 so as to rotate with it. The pawl 13 is held by the guide portion 11 of the closed space 5 so as to slide on the lower arm 1. Owing to the sliding movement of the pawl 13, the pawl 13 can come into and out of engagement with the ratchet 21. The guide portion 11 has substantially the same width as that of the pawl 13, and has a pair of parallel side surfaces 11a opposite to each other. These side surfaces 11a extend in the direction of sliding movement of the pawl 13. The pawl 13 is positioned between these slide surfaces 11a, guided, and held by them. The cam member 43 rotates and comes into sliding contact with a cam surface 1a formed on the lower arm 1 and with a cam surface 13b formed on the pawl 13. The sliding contact between the cam member 43 and the cam surface 13b controls the sliding movement of the pawl 13 (i.e., brings the pawl 13 into and out of engagement with the ratchet 21). With respect to the sliding contact between the cam member 43 and the cam surface 1a, during engagement between the pawl 13 and the ratchet 21, the cam member 43 and the cam surface 13b of the pawl 13 come into sliding contact with each other. Furthermore, the pawl 13 and the ratchet 21 come into contact with each other. In consequence, the upper arm 2 is lowered relative to the lower arm 1 in the downward direction as viewed in FIG. 2. This forces the arc-shaped protrusion 31 of the bearing mechanism 3 against the wall surface of the arc-shaped recess 32. The play of the bearing mechanism 3 is controlled in this manner.

An operation lever 44 is firmly mounted to the rotating shaft 4 so as to rotate with it. This lever 44 is located outside the lower arm 1. A cam slot 44a is formed in the lever 44 and extends in the direction of rotation of the operation lever 44. The slot 44a is bent to define the direction of sliding movement of the pawl 13. A pin 13c mounted on the pawl 13 is inserted in the cam slot 44a. The cam slot 44a and the pin 13c cooperate to control the movement of the pawl, i.e., to bring the pawl 13 into and out of engagement with the ratchet 21. The pin 13c on the pawl 13 passes through a slot 1b extending in the direction of the sliding movement of the pawl 13, the slot 1b being formed in the lower arm 1. The pin 13c extends outwardly of the closed space 5.

A spiral spring (not shown) for biasing the upper arm 2 in one direction relative to the lower arm 1 and a coil spring (not shown) for resisting rotation of the operation lever 44 are disposed around the front end of the rotating shaft 4. A spline 45 is formed at the end of the rotating shaft 4 on the side of the upper arm 2. An interlocking shaft (not shown) is mounted to a rotating shaft (not shown) that controls rotation of an upper arm (not shown) mounted to the other side of the seat back 7 relative to a lower arm (not shown) mounted to the other side of the seat cushion 6. This interlocking shaft is used to synchronize the control of the rotation of the seat back 7 relative to the seat cushion 6 on each side.

Figure 3:
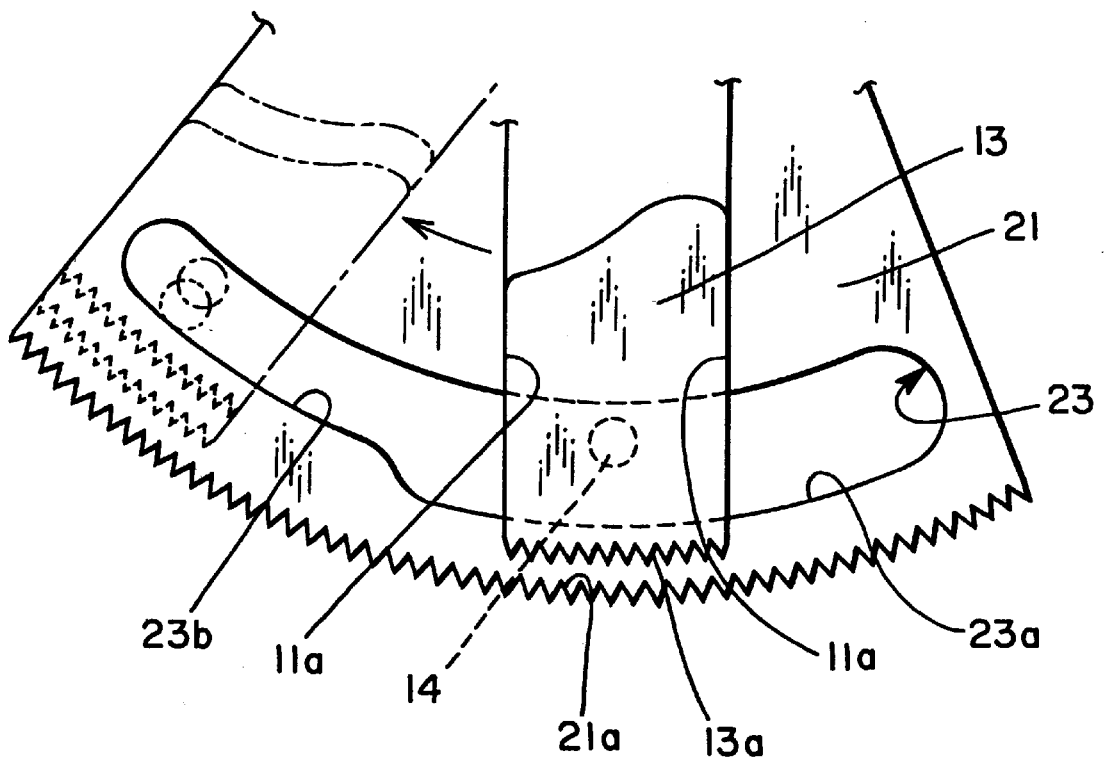
FIG. 3 is a fragmentary view of the seat-reclining device shown in FIG. 1, illustrating the operation of the pawl.

As shown in FIGS. 1–3, the ratchet 21 has arc-shaped internal teeth 21a about the rotating shaft 4. The pawl 13 has external teeth 13a capable of coming into mesh with the internal teeth 21a of the ratchet 21 when the pawl makes sliding movement. The internal teeth 21a of the ratchet 21 meshes with the external teeth 13a of the pawl 13, i.e., the ratchet 21 and the pawl 13 mesh with each other, thus limiting rotation of the upper arm 2 relative to the lower arm 1. Rotation of the upper arm 2 relative to the lower arm 1 is permitted by disengaging the internal teeth 21a of the ratchet 21 from the external teeth 13a of the pawl 13, i.e., disengaging the pawl 13 from the ratchet 21.

The ratchet 21 of the upper arm 2 is half blanked or pressed almost over the whole length of the internal teeth 21a to form an integral, arc-shaped cam slot 23 extending circumferentially about the center of the rotating shaft 4. The bottom surface of the cam slot 23 forms a cam surface bent radially. This cam surface has a radially widened portion 23a and radially narrowed portion 23b that are adjacent to each other circumferentially. A pin 14 protruding toward the upper arm 2 is formed integrally with the pawl 13 by half blanking or pressing. The pin 14 is inserted in the cam slot 23 and can bear against the cam surface. The widened portion 23a extends over a given angular range (adjustable range A in FIG. 4) from the rear end (right end as viewed in FIG. 1) of the internal teeth 21a at which the tilt angle of the seat back 7 to the seat cushion 6 is greatest. The increased width of the widened portion 23a inhibits abutment of the pin 14 against the cam surface but permits sliding movement of the pawl 13 so that the internal teeth 21a of the ratchet 21 can come into and out of mesh with the external teeth 13a of the pawl 13. The narrowed portion 23b is located near the front end of the internal teeth 21 (left end as viewed in FIG. 1) (the fully forwardly tilted state B in FIG. 4) at which the tilt angle of the seat back 7 to the seat cushion 6 is minimum. The decreased width permits abutment of the pin 14 against the cam surface. This abutment limits sliding movement of the pawl 13 and thus limits meshing engagement of the internal teeth 21a of the ratchet 21 with the external teeth 13a of the pawl 13.

In the structure described above, the pin 14 on the pawl 13 is usually located inside the widened portion 23a of the cam slot 23. The teeth 13a of the pawl 13 are in mesh with the internal teeth 21a of the ratchet 21. That is, the pawl 13 is in mesh with the ratchet 21, limiting rotation of the upper arm 2 relative to the lower arm 1. The seat back 7 is maintained at a given angle to the seat cushion 6. Under this condition, if the operation lever 44 is operated in one direction, the cam member 43 is rotated in a clockwise direction as viewed in FIG. 1, disengaging the cam member 43 from the cam surface 13b of the pawl 13. The cam slot 44a in the operation lever 44 causes the pawl 13 to make sliding movement along the side surfaces 11a of the guide portion 11 toward the rotating shaft 4. As a result, as indicated by the solid line in FIG. 3, the internal teeth 21a of the ratchet 21 disengage from the external teeth 13a of the pawl 13. That is, the pawl 13 comes out of engagement with the ratchet 21. This allows the upper arm 2 to rotate relative to the lower arm 1.

Under this condition, if the seat back 7 is rotated relative to the seat cushion 6, the tilt angle of the seat back 7 to the seat cushion 6 can be adjusted to a desired angle within the adjustable range A shown in FIG. 4. When the operation lever 44 is stopped from being operated, the cam member 43 comes into sliding contact with the cam surface 13b of the pawl 13 in a manner opposite to the above-described process. The pawl 13 slides away from the rotating shaft 4. The external teeth 13a of the pawl 13 again come into mesh with the internal teeth 21a of the ratchet 21. This restricts rotation of the upper arm 2 relative to the lower arm 1. Consequently, the seat back 7 is maintained at a given angle to the seat cushion 6.

If the seat back 7 is fully forwardly tilted (state B shown in FIG. 4) about the seat cushion 6, the pin 14 on the pawl 13 is placed within the narrowed portion 23b of the cam slot 23, as indicated by the dot-and-dash line in FIG. 3. Therefore, even if the operation of the operation lever 44 is stopped, the pin 14 bears against the cam surface 23b, limiting sliding movement of the pawl 13, as indicated by the phantom line in FIG. 3. The teeth 13a of the pawl 13 do not mesh with the internal teeth 21a of the ratchet 21. If the seat back 7 is returned into its original attitude from the fully forwardly tilted state B, the pin 14 is put within the widened portion 23a of the cam slot 23. The external teeth 13a of the pawl 13 can again mesh with the internal teeth 21a of the ratchet 21.

In the present invention, there is provided a limiting means for maintaining a pawl in disengagement from a ratchet. This limiting means assures that the pawl is held at a distance from the ratchet. Hence, interference and sliding contact between the pawl and the ratchet can be prevented with certainty.

As many apparently widely different embodiments of the present invention can be made without departing from the spirit and scope thereof, it is to be understood that the invention is not limited to the specific embodiments thereof except as defined in the appended claims.

What is claimed is:

1. A seat reclining mechanism for vehicles comprising:

a lower arm adapted to be secured to a frame of a seat cushion;

an upper arm adapted to be secured to a frame of a seat back;

a shaft passing through the arms and rotated by a manual operation lever secured to one end of the shaft;

a cam member arranged in a space defined by opposed flat wall portions of the arms and fixed to a part of the shaft;

a pawl member arranged in the space between the arms and being slidable in one direction in accordance with the rotational movements of the cam member and the operation lever, the pawl member having external teeth at one end and a pin like projection;

a ratchet member formed on the upper arm and having internal teeth;

a cam slot formed on the upper arm along the internal teeth, the cam slot having a cam surface engageable with the pin like projection to limit sliding movement of the pawl member toward the engagement of the external teeth of the pawl and the internal teeth of the ratchet member, the cam slot being provided with a narrowed cam surface portion wherein a tilting angle of the seat back with respect to the seat cushion is in a predetermined forward range and engagement of the internal teeth and the external teeth is prevented when the pin like projection is positioned therein, and a widened cam surface portion wherein the external teeth of the pawl come into and out of mesh with the internal teeth of the ratchet by sliding of the pawl when the pin like projection is positioned therein a radially extending slot provided on the lower arm;

a circumferentially extending slot provided on the operation lever; and a pin of the pawl member passing through the radially extending and circumferentially extending slots so that the sliding movement of the pawl member is ensured by the operation of the operation lever.

2. A seat reclining mechanism of claim 1, wherein the pawl member is slid along a guide groove formed on the lower arm.

\* \* \* \* \*